United States Patent [19]

Brieger

[11] 4,203,607
[45] May 20, 1980

[54] HIGH PRESSURE, FLUID TIGHT SEAL

[76] Inventor: Emmet F. Brieger, Nogal, N. Mex. 88341

[21] Appl. No.: 746,601

[22] Filed: Dec. 1, 1976

[51] Int. Cl.² .................. B65D 53/00; F16J 15/00
[52] U.S. Cl. ........................ 277/188 A; 277/72 FM
[58] Field of Search .............. 277/188 A, 188 R, 189, 277/17, 18, 19, 72 FM, 165

[56] References Cited

U.S. PATENT DOCUMENTS

| | | | |
|---|---|---|---|
| 2,520,306 | 8/1950 | Detweiler | 277/188 A |
| 2,587,810 | 3/1952 | Beyer | 277/188 R |
| 2,797,971 | 7/1957 | Greenough | 277/188 A |
| 2,810,592 | 10/1957 | Williams | 277/72 FM |
| 2,963,304 | 12/1960 | Comlossy | 277/188 A |
| 2,973,978 | 3/1961 | Oppenheim | 277/188 A |
| 3,146,683 | 9/1964 | Hoftmann | 277/188 R |
| 3,186,702 | 6/1965 | Taylor | 277/188 A |

Primary Examiner—Herbert F. Ross

[57] ABSTRACT

A system for effecting a fluid tight seal between two surfaces where one of the surfaces has an annular recess for receiving an annular sealing element which typically is an elastomeric sealing element. The sealing element is compressed when disposed between the surfaces to be sealed and a supplemental sealing element is disposed in the groove between the sealing element where the supplemental sealing element is comprised of a semi-fluid bridging material containing particulate matter. The particulate matter is sized so as to be larger than a clearance space between the surfaces thereby providing material to bridge the clearance space and prevent the extrusion of the principal sealing element in the event of high pressure.

5 Claims, 4 Drawing Figures

HIGH PRESSURE, FLUID TIGHT SEAL

FIELD OF THE INVENTION

The present invention relates to fluid tight seals, and more particularly to a sealing mechanism between adjacent surfaces where the sealing mechanism is disposed in an annular groove and provides a mechanical bridge to prevent extrusion of an O-ring.

DESCRIPTION

This invention will be described in connection with "O" ring seals since they represent the most common application of the present invention but there is no intention of so limiting the invention.

In telescoping or interfitting cylindrical members, such as a piston and cylinder or interconnected tubular members or the like it is common practice to use an "O" ring whereon it is desired to prevent leakage of fluid between the two members. The "O" ring sealing element typically is a rubber elastic and relatively impermeable material which can be hard rubber or plastic materials as is well known in the art. The material composition of the "O" ring itself determines such factors as elasticity, temperature resistance, shelf life and its life under pressure and temperature. Such design factors are well known to those skilled in the art. Typically the "O" ring sealing element is disposed in an angular groove on one of the interfitting members and sized so as to be under compression between the members. The compressive forces of the "O" ring provide a very simple and effective sealing device when a pressure is applied in the space between the interfitting members. A pressure differential applied across an "O" ring causes the "O" ring to act somewhat as a liquid in that it tends to flow or extrude into the annular clearance space between the interfitting members. If the clearance space between the interfitting members is large enough or the differential pressure of fluid next to the "O" ring is too great it is possible to drive the "O" ring from its groove through the clearance space between the interfitting members and thereby lose the entire sealing effect.

As is obvious, if the extrusion or flow of the "O" ring under pressure through the clearance space between members can be prevented then the seal can take higher pressures and temperatures without being lost. Typically, devices for preventing the extrusion of the "O" ring are generally catergorized as backup rings or the like and may be made of leather, hard rubber, metal and are generally intended to provide a bridge over the clearance space between the interfitting members. Basically, backup members provide two areas of concern, one of which is the cost involved and the other which is the difficulty in positioning the backup device within the sealing groove.

It is an object of the present invention to provide a backup system for "O" rings to which is simple in construction, easily applied and is relatively low cost and yet provides an effective and durable backup element for "O" rings.

SUMMARY

In this invention the "O" ring groove in one of the interfitting members is provided with the conventional annular "O" ring sealing element. Between the "O" ring sealing element and one of the shoulders or edge surfaces of the groove is a molded ring of low viscosity material which contains particulate grit material inclusions such as metal, silica, asbestos, carborundum, stone or the like. The particulate size of the grit material is made so that most of the particles are greater in size than the largest clearance space between the interfitting members. The viscous material can be performed into semi-circular segments for easy insertion or can be also made of a molded rubber or cast material. When differential pressure is applied across the "O" ring, the "O" ring will extrude the grit laden low viscosity material toward the low pressure clearance space and carry with it the grit particles. The viscous material can flow through the clearance space but the particles will be deposited at the entry of the clearance space thereby building up a bridge on the clearance space gap between the housing and the other member. By closing the clearance space the "O" ring cannot extrude through the clearance space and hence the seal can be maintained independent of pressure and temperature.

BRIEF DESCRIPTION OF DRAWINGS

The invention will be described hereinafter by way of an example with reference to the accompanying drawings in which.

DESCRIPTION OF THE INVENTION

Figure 1:
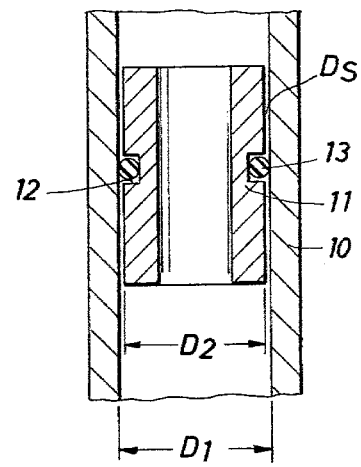
FIG. 1 is an illustration in partial section of a seal in accordance with prior art illustrating extrusion of the seal under the effects of pressure.

Referring now to FIG. 1, a typical application for an "O" ring is illustrated. A tubular member 10 shown in cross-section has, for example, an inner diameter $D_1$ slidably and telescopically received over a cylindrical member 11 which has an outer diameter $D_2$. The difference between the diameters $D_1$ and $D_2$ defines the clearance space $D_S$ between the members. It will be appreciated that the clearance will vary from a minimum value where the cylinder 11 is concentrically disposed within the tube 10 to a maximum value where the cylinder 11 is excentrically disposed to one side of the tubular member 11. The cylindrical number 11 contains an annular groove 12 which is sized to receive an annular "O" ring 13. The "O" ring is sized relative to the groove and the relative clearance space between the parts to be under compression so as to provide a fluid type seal.

Upon the application of a differential pressure across the "O" ring seal, i.e., a pressure in the clearance space on one side of the seal which is higher than the pressure on the other side of the seal, the "O" ring is forced into the clearance space. As the pressure and the temperature is increased, the "O" ring tends to act as a fluid and will flow or extrude into the clearance space between the cylinder and tubular member. This results in the eventual rupturing of the "O" ring and the loss of the seal.

Figure 2:
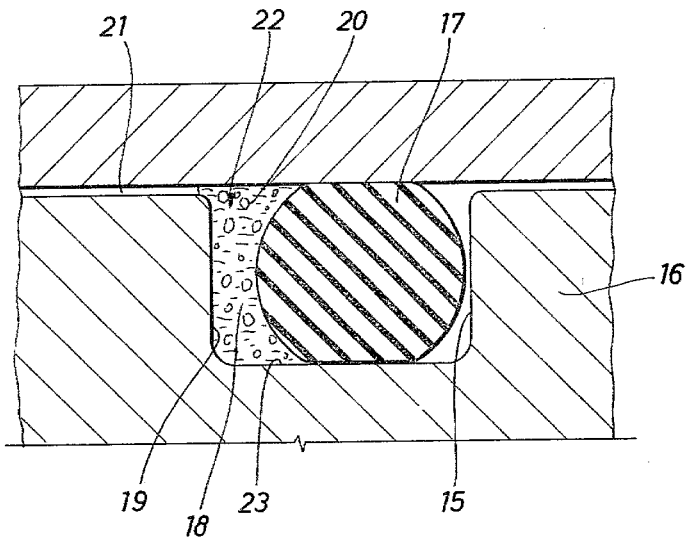
FIG. 2 is a view in partial cross-section.

There are many factors in the design of an "O" ring to make it effective so that it will be less likely to extrude and more likely to seal under increasing pressure and temperature. An illustration of the invention in partial cross-section is shown in FIG. 2. In FIG. 2, an annular groove 15 is disposed in a cylindrical member 16. The groove 15 is enlarged slightly in a lengthwise direction so that it receives both an "O" ring 17 and an annular packing 18 of grit material in a paste like material. The grit member can be steel, copper, iron, silica, asbestos, carborundum, stone or the like and the paste-like material can be a heavy silicone grease or petroleum product grease. In this form of the invention the grit ladened grease is packed in the space between the shoulder 19 of the groove 15 and the "O" ring 17. The grit laden grease is disposed to the side of the groove 15 which is forward of the "O" ring in respect to a direction for moving the "O" ring into the tubular member. The grit particles 20 are sized to approximately the maximum width of the clearance 21 between the cylinder and the tubular member. For example, if the maximum diametrical clearance between the piston and housing is 0.006 inches, i.e. 0.003 inches on each side of the cylinder 16, then the grit size should be in the range of 0.007 inches to 0.010 inches. Depending upon the circumstances, it is possible to vary the grit size from larger particles near the open end 22 of the groove to smaller particles near the bottom 23 of the groove to enhance the bridging effect.

Figure 3:
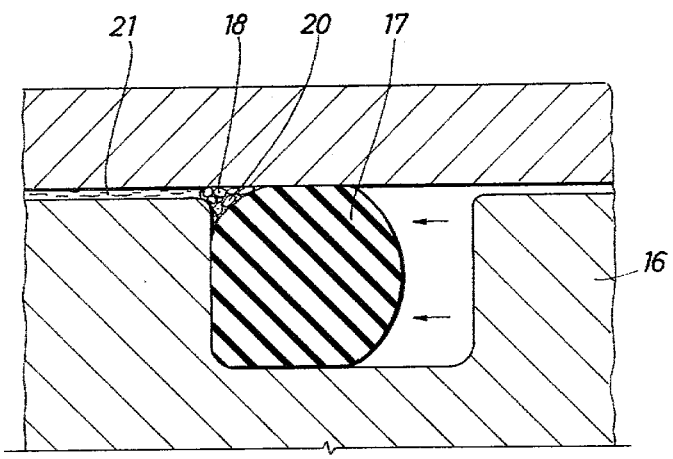
FIG. 3 is a view similar to FIG. 2 but illustrating the action of the bridging mechanism.
Figure 4:
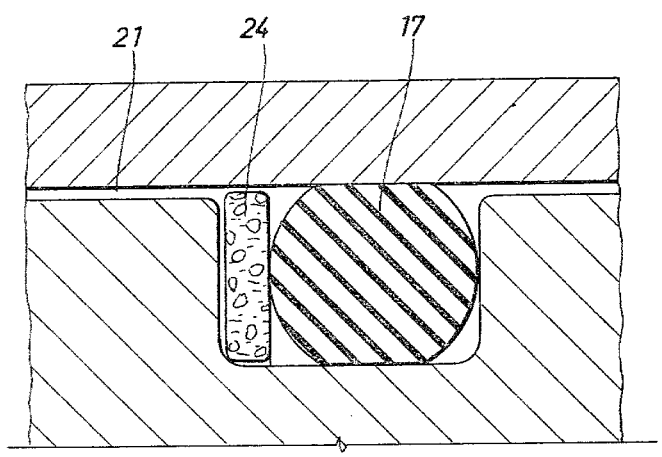
FIG. 4 is a variation of the form of invention shown in FIG. 2.

As shown in FIG. 3, as pressure is applied a differential pressure is applied across the "0" ring the "O" ring 17 will force the grit-laden grease to flow into the lower pressure clearance space 21. As the grease flows into the clearance it will carry the grit particles 20 with it and since the particles 20 are larger than the clearance space 21 they will be deposited at the entry of the clearance space and will build up to bridge the gap between the cylinder and tubular member thereby closing the clearance space. Once the clearance space 21 is mechanically closed by the grit particles the "O" ring cannot extrude through the clearance space and thereby the seal is maintained independent of temperature and pressure.

While the foregoing system employs a paste and particulate matter which can be packed into position between the "O" ring and side of the groove prior to assembly of the unit, preformed filler elements can be used. A preformed element can be formed by molding or casting into semi-circular or annular segments or a spiral member which can be easily inserted in place. Similarly, the grit can be molded within a soft relatively weak, rubber-like material in the shape of a ring similar to an "O" ring with the intention of the rubber extruding through the clearance leaving the particles to form the bridge. Likewise, the soft rubber ring can be made in segments for easy insertion. Other materials for the building element may, for example, be putty, caulking compound or other jelly or clay-like materials. Further, a suitable plaster material can be used so long as its properties permit it to flow under pressure and temperature.

While this invention has particularly been explained in regard to telescoping members, it is equally applicable to sealing against flat surfaces.

It should be appreciated that the present invention will permit equipment to be measurably improved as to its pressure and temperature capabilities without any change in the present equipment. No redesign is necessary and it is obvious the present system can be used on existing systems.

What is claimed is:

1. A sealing mechanism for improving the sealing effect of O-rings comprising:
    telescoping members where one of said members has a groove for receiving a sealing element therein;
    a sealing element in said groove, said sealing element is an O-ring disposed under compression between said telescoping members;
    a flowable material disposed between said sealing element and on side wall of said groove, particulate grit material disposed in said flowable material and sized to block off the clearance space between said members upon the application of pressure to the sealing element, said flowable material is a viscous paste.

2. The sealing mechanism as defined in claim 1 wherein said telescoping members have a clearance space therebetween and said particulate grit material is sized to bridge over said clearance space.

3. A sealing mechanism for improving the sealing effect of O-rings comprising:
    at least two impervious members in side-by-side relationship;
    an O-ring groove in one of said members and an O-ring sealing means in said groove for providing a seal between said two members;
    a bridging mechanism disposed in said groove to one side of said O-ring, said bridging mechanism including particulate matter sized to the maximum clearance space between said members and carried in a binding material which is soft enough to flow under pressure through the clearance space.

4. A high pressure sealing means disposed between two adjacent members, for preventing the flow of liquid therebetween, including:
    A sealing groove in at least one of said members;
    sealing means in said groove for providing a fluid-tight seal between said members and subject to extrusion from said groove in response to temperature and/or pressure;
    means for preventing extrusion of said sealing means from said groove including particulate, bridging, metallic materials encased in an elastomer material with a numerousity such that said materials tend to coagulate upon the application of pressure to said sealing means thereby preventing extrusion of said sealing means between said adjacent members.

5. The apparatus as defined in claim 4 wherein said metallic materials are copper and are sized to build a bridging element upon compression of said elastomer material.

* * * * *